April 20, 1937.  J. R. YANCEY  2,077,507
DEVICE FOR ADJUSTING FITTINGS AND THE LIKE UNDER FLUID PRESSURE
Filed Dec. 2, 1935  3 Sheets-Sheet 1
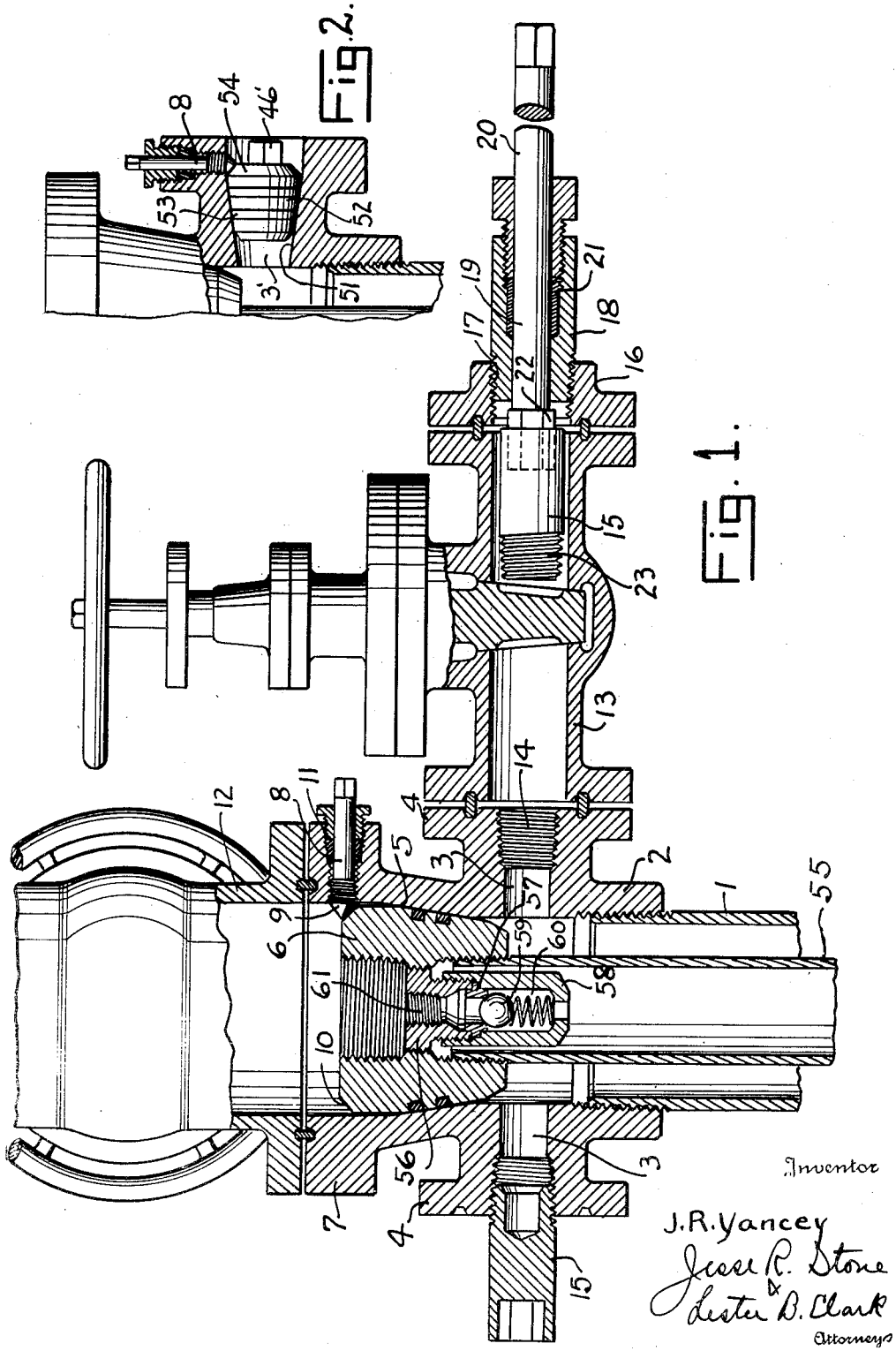

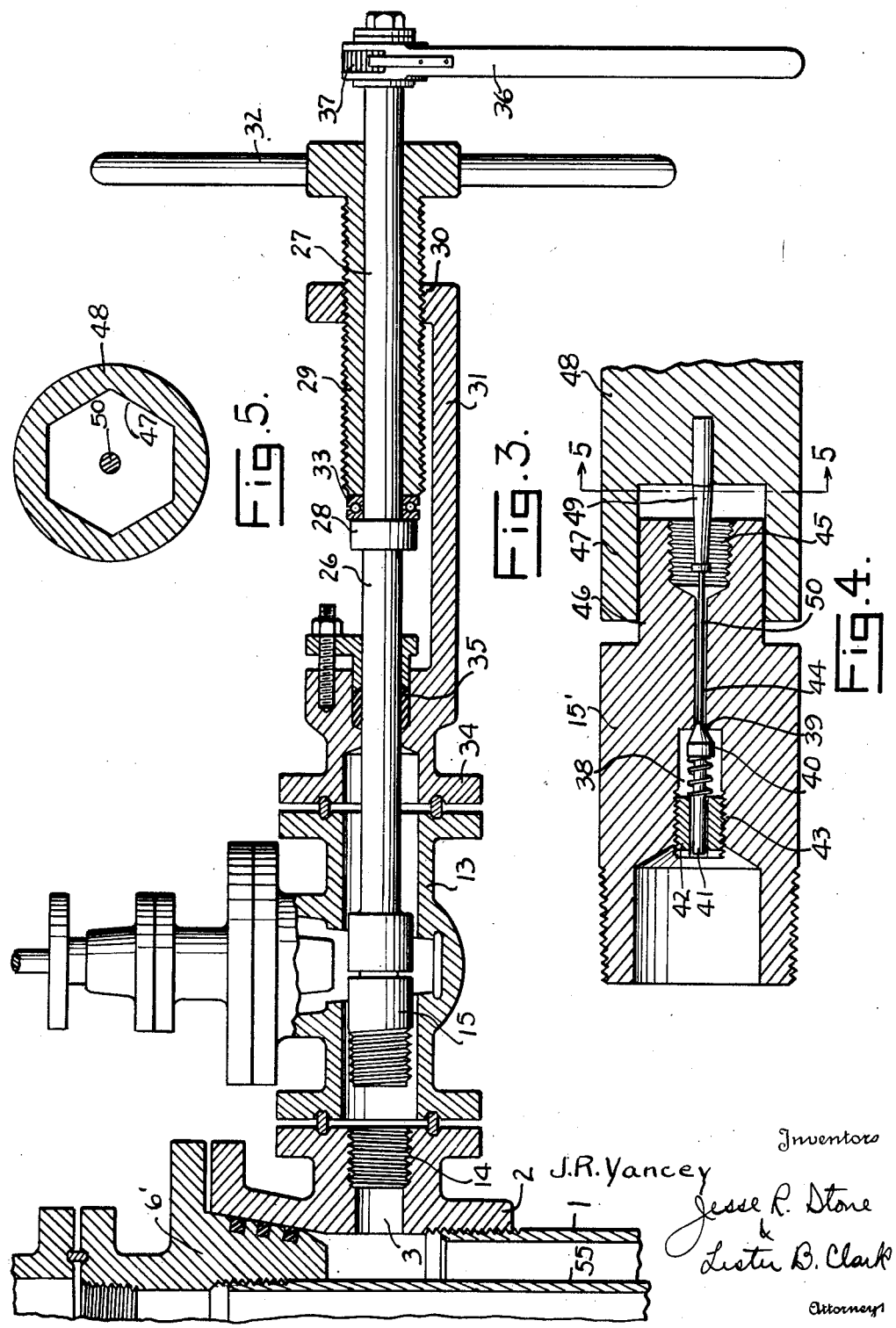

Patented Apr. 20, 1937

2,077,507

UNITED STATES PATENT OFFICE 2,077,507

DEVICE FOR ADJUSTING FITTINGS AND THE LIKE UNDER FLUID PRESSURE

John R. Yancey, Houston, Tex., assignor to Gray Tool Company, a corporation

Application December 2, 1935, Serial No. 52,585

1 Claim. (Cl. 29—84)

The invention relates to means and method of attaching and detaching fittings, such as valves, packing devices, hangers, and the like, under strong gas pressure. It is adapted particularly for use on the apparatus employed in equipping and handling oil or gas wells.

It very commonly happens that valves and fittings about the well head equipment become worn or broken and need replacement or that a valve or other fitting needs to be inserted where previously there was no valve. If the well is under heavy gas pressure such an operation is ordinarily impossible without cutting off the flow of production from the well by closing the master valve or even by putting back pressure upon the well by forcing into the well a large volume of heavy mud which temporarily, at least, and perhaps permanently, kills the well.

It is an object of this invention to provide means to make changes in the well head equipment under pressure without interfering with the continued operation of the well.

I desire to make changes in valves and other devices without the necessity of discontinuing the flow of fluid from the well, and to employ means which are not liable to be rendered ineffective by corrosion and the like.

It is a further object of the invention to provide a device to accomplish the making of changes of the character noted safely and easily.

The invention also finds a use in closing off or opening the tubing to flow of fluid whenever desired, before or after opening up the well for production, so that any desired changes may be made in the other control devices through which the well fluid may pass.

Referring to the drawings herewith, Fig. 1 is a side view partly in central vertical section illustrating various uses for our invention.

Fig. 2 is a broken detail illustrating one type of closure means which may be employed.

Fig. 3 is a side view partly in central vertical section illustrating the manner in which the device may be operated.

Fig. 4 is an enlarged longitudinal section showing the type of plug which is ordinarily employed with our invention.

Fig. 5 is a transverse section on the plane 5—5 of Fig. 4.

Figure 6:
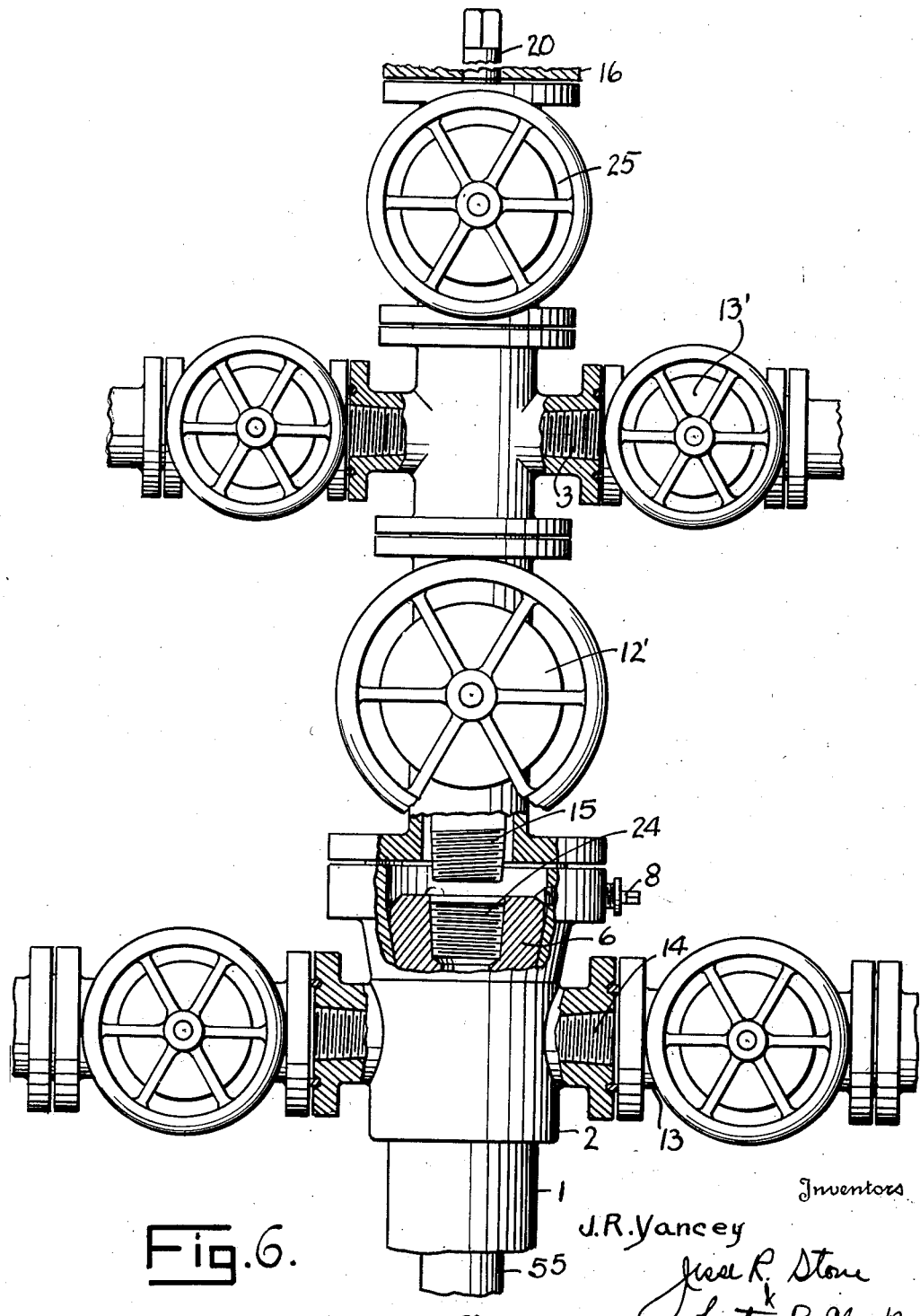
Fig. 6 is a side elevation showing an assembly of valves and other fittings wherein valves may be removed and changed by the use of our invention.

The device is designed primarily for use upon the fittings about the well head in oil and gas wells where the well is under high gas pressure. Where such high pressure exists it is well known that it is difficult or impossible to make changes in valves or other fittings connected with the flow line without previously employing some means to close off the flow from the well. I desire by my device to allow the well to continue to flow under normal circumstances while valves and fittings are removed and replaced when desired.

Referring to Fig. 1, I have shown a well casing I of ordinary construction having at its upper end a casing head 2. Said casing head has lateral outlets 3 in the usual manner, said outlets having radial flanges 4 thereon by means of which connections may be made with valves, pipes or other fittings. The upper end of the casing head is shown as having the usual tapered seat 5 within which a tubing hanger 6 may be supported. There is a radial flange 7 at the upper end of the casing head, said flange having one or more radial openings therein threaded to receive the locking bolts 8. The locking bolts 8 are threaded at their inner ends to screw within the openings in the casing head, the inner ends of said bolts being tapered at 9 to engage against a tapered face 10 upon the upper end of the hanger 6 and hold said hanger locked in position within the casing head. There is a stuffing box 11 about the bolt 8 to prevent the escape of fluid around the said bolt.

The upper end of the well may be equipped as desired. I have shown the lower end of a gate valve 12 seated upon the flange 7 of the casing head and having a sealing engagement therewith. It is to be understood, however, that other devices such as blowout preventers and the like may be connected with the flange 7 whenever desired.

The lateral openings 3 in the casing head are adapted to be connected with a fluid line having valves and other fittings therein. At the right hand port 3 of the casing head is shown a gate valve 13 of ordinary construction adapted to have a flanged connection with the casing head. The interior of the flange opening 3 is provided with a threaded socket 14 into which a plug 15 may be screwed.

At the outer end of the gate valve 13 is a plug operating member including a flanged plate 16 having a threaded opening 17 therein to receive a plug 18. Said plug has an axial opening therethrough to slidably receive the stem 19 of an operating shaft or handle 20. A seal is provided around the said shaft 20 by means of a stuffing box 21.

The inner end of the shaft 19 has preferably formed thereon a wrench head 22. Said head may be a socket or the exterior may be made polygonal, as shown in Fig. 1, to engage within a socket in the outer end of the plug 15. The plug 15 is threaded at its inner end 23 to engage the threaded socket 14.

When it is desired to remove the valve 13 while the well is under pressure the plate 16 with the wrench handle mounted therein as shown is secured to the outer end of the valve in sealing engagement, the wrench handle being in place and the plug 15 mounted on the forward end thereof. When this seal has been made the gate valve 13 may be opened and the plug 15 may be moved forwardly and screwed within the socket 14. When this is done the gate valve may be removed and other fittings attached in place or the opening may be left closed by means of the plug 15.

If it is desired to place the valve in position and connect it with the casing head, as might be necessary on the lefthand opening 3 upon the casing head, it will be obvious that a valve, equipped as shown at the right of Fig. 1, could be mounted in place over the end of the inserted plug 15.

When thus secured in position the wrench handle could be employed to reach through past the open valve gate and engage within the socket in the outer end of the plug 15 and unscrew the same. When unscrewed, the plug could be withdrawn to the outer end of the valve housing and the gate valve closed, and when thus closed the operating wrench could be removed and other connections made at the outer end of the valve housing. It will thus be seen that valves can be attached or removed under pressure in connection with the well head equipment. In Fig. 6 we have illustrated how such plug fittings can be removed or attached, at various points about the well head equipment. The upper valves 13' and 12' may also be removed or attached under pressure without interrupting the flow of fluid from the well.

Also a plug 15 may be inserted within the threaded socket 24 in the hanger 6. This opening may be plugged or opened when plugged by the operation of our wrench 20 through the upper valve 25.

It will be obvious that when a plug such as the plug 15 shown at the left of Fig. 1 is unscrewed from its connection with the casing head the pressure within the well will tend to blow the valve outwardly with some violence unless this movement of the valve is restrained. In Figs. 3 and 4 apparatus is shown whereby this liability to injury may be avoided. In the Fig. 3 embodiment the wrench shaft 26 has its outer end extended beyond its usual length, as shown at 27. A radial flange 28 is formed upon the wrench shaft intermediate its ends and an exteriorly threaded sleeve 29 is fitted over the extension 27 upon the shaft. This sleeve acts as a nut and engages through a threaded opening 30 in a body member bracket 31. The outer end of the sleeve 29 is provided with a handle 32 whereby it may be rotated.

Between the inner end of the sleeve 29 and the flange 28 is shown an anti-friction bearing member 33 of ordinary construction whereby relative rotation of the sleeve 29 and the wrench shaft 27 may take place even under heavy pressures. The bracket 31 is formed upon a flanged plate 34 similar to the plate 15 previously described. The outer end of the plate is fitted about the shaft 26 and forms a sealing engagement with the shaft by means of the stuffing box 35.

The outer end of the wrench shaft 27 may have any preferable type of lever or handle thereon and we have shown a lever arm 36 having a ratchet 37 thereon by means of which the shaft may be rotated by pumping action as is commonly done on devices of this character.

By the use of the plug operating mechanism here shown it will be seen that the wrench handle may be forced through into engagement with the plug 15 when the plug is to be removed. The inner end of the sleeve 29 will bear against the wrench shaft through means of the anti-friction bearing 33 and the flange 28 and pressure may be exerted thereon while the plug is being unscrewed. The sleeve 29 may be gradually screwed outwardly as the plug is unscrewed from the socket 14. When the pressure tends to escape around the plug as it becomes loosened the tendency of the pressure fluid to blow the plug outwardly into the valve housing will be restrained by the action of the sleeve 29. As soon as the valve housing 13 is filled with the pressure fluid from the well no further difficulty will be experienced. The valve may be moved outwardly by further unscrewing of the valve 29 and the gate valve closed and the plug removed.

In Fig. 4 is shown a device whereby the pressure may be equalized upon the valve before removal is commenced. Thus the plug 15', shown in Fig. 4, has on its inner end a valve chamber 38, at the inner end of which is a valve seat 39. A valve 40, adapted to fit said seat, has a stem 41 thereon fitting loosely within a guide plug 42 at the outer end of the valve chamber. A spring 43 about the valve stem bears against the valve and tends to hold the valve seated within the seat 39.

The seat 39 communicates with the passage 44 extending axially outwardly through the plug and into the threaded opening 45 at the outer end of said plug.

The plug has its outer end reduced in diameter at 46 and is polygonal in shape to receive the forward socket 47 upon the head 48 of the wrench.

The head 48 is formed with a forwardly projecting post 49 thereon, which has a reduced extension 50 at its forward end to project slidably through the opening 44 in the plug and to engage with the inner end of the valve 40.

In this embodiment the pressure will be equalized on the outer side of the valve plug before unscrewing is initiated. The forward extension 50 upon the post 49 will engage with the valve and unseat the same before the socket on the forward end of the wrench has fully telescoped over the end of the plug. When the valve is thus unseated the pressure fluid will escape around the outer end of the plug and through the socket of the wrench and the pressure will be quickly equalized so that the plug may be unscrewed without further difficulty.

In Fig. 2 is shown a side outlet 3' upon the casing head, which is formed with an inwardly tapered seat 51 thereon, which is smoothly ground to receive a plug 52. This plug is provided with sealing rings 53 thereon to assist in forming a seal between the plug and the seat. The outer end of the plug is beveled at 54 to be engaged by a locking pin 8 similar to that disclosed in Fig. 1, so that when the plug is firmly seated it may be held in that position by one or more of these locking bolts 8. The outer end of the plug has a hexagonal projection 46' thereon to receive the wrench as shown in Fig. 4. This type of plug is preferable to a threaded plug in most instances because of the fact that it is readily removable even after it has been in use for long periods of time. The ordinary threaded plug is found to be quickly corroded and when it is desired to unscrew the plug it is sometimes found practically impossible to do so because the plug is frozen or corroded into its socket and can not be moved. Where a tapered plug, such as shown at 52, is employed, however, the plug will not stick in the seat but will be forced outwardly by the inner pressure in the well as soon as it is released by unscrewing the locking pins 8. It will be obvious that this type of plug may be inserted and withdrawn in the same manner as are the threaded plugs.

In the handling of production from a well under gas pressure it has been found dangerous to close down or shut off the flow of the oil from the well. When the flow is stopped it is frequently found that it is very difficult to get it started again, particularly when pressure is only moderately high. For this reason the ability to remove and replace fittings or connect up valves to the well where additional flow lines are desired is a great benefit to the operator. Sometimes, however, it is necessary to make changes which necessitate the removal of all of the fittings above the casing head. If this is desired, the production through the tubing must be closed off. This may be accomplished, as seen in Fig. 6, by inserting the plug downwardly into the socket 24 in the tubing hanger 6. When this opening has been thus closed all the fittings above the casing head may be taken off and repairs or replacements made thereon after which they may be again mounted in position upon the casing head.

Also, in the original bringing in of the well the tubing 55 may be closed while the setting of the tubing is accomplished by a valve as shown in Fig. 1. The hanger 6 is threaded at an intermediate point to engage with the valve body 56. Said valve body has a valve seat 57 held in place by the valve cage 58. The valve 59 may be held inwardly upon its seat by means of a spring 60.

Where this valve is thus mounted fluid may be pumped into the well but the escape of fluid outwardly past the valve will be prevented. It will be obvious that this valve may be removed from the upper end of the tubing when the upper equipment from the well is in position ready to bring in the well. To do this a wrench having a forward threaded end thereon may be screwed within the socket 61 at the upper end of the valve body and the valve thus unscrewed and removed without difficulty. Where high pressures are encountered the valve 59 may be unseated before the unscrewing operation is started by employing a pilot extension post 50 on the wrench in the manner shown in Fig. 4. This will enable the valve to be readily removed upwardly through the fittings so that the upper gate valves may be closed and the well will be ready for production.

Various features of the present construction are shown in the prior patent to Mueller, No. 1,701,691, issued February 12, 1929, our improvement thereon lying in the means by which the device therein disclosed is adapted for use upon well head equipment in the manner described. The invention lies in the means whereby this adaptation is made and is limited in scope to the structure set out in the claim appended hereto.

What is claimed as new is:

A plug inserting and removing tool comprising a body member provided with means whereby it may be secured in sealed engagement against the open bore of a pipe fitting, an aperture in said member adapted to be aligned with the bore of the fitting, a plug engaging element rotatable in said member and including a shaft extending through the member aperture, means in the aperture to form a seal about the shaft, said member including a second aperture concentric with the first aperture, a pressure sleeve having threaded engagement with the last mentioned aperture, said shaft extending through said pressure sleeve, the inner end of said pressure sleeve being adapted to bear against a shoulder on said shaft so that the shaft and plug engaging element may be forced into the bore of the pipe fitting and outward movement of a plug under pressure may be controlled.

JOHN R. YANCEY.